United States Patent [19]

Bolton et al.

[11] Patent Number: 4,907,294
[45] Date of Patent: Mar. 6, 1990

[54] LOG SCANNING SYSTEM

[75] Inventors: William E. Bolton, Corvallis; Jeffrey D. Ballance, Albany; Dale E. Campbell, Oregon City, all of Oreg.

[73] Assignee: U.S. Natural Resources, Inc., Vancouver, Wash.

[21] Appl. No.: 187,272

[22] Filed: Apr. 28, 1988

[51] Int. Cl.$^4$ .............................. G06F 15/46; B27B 1/00
[52] U.S. Cl. ................................ 364/474.09; 83/365; 144/357; 144/359; 250/563; 364/507
[58] Field of Search ............... 364/468, 478, 474.09, 364/507, 560; 144/356, 357, 379; 83/365, 370, 371, 71, 72; 250/560–563, 571, 224

[56] References Cited

U.S. PATENT DOCUMENTS

| | | | |
|---|---|---|---|
| 3,736,968 | 6/1973 | Mason | 144/357 |
| 3,972,624 | 8/1976 | Klein et al. | 356/431 |
| 3,983,403 | 9/1976 | Dahlstrom et al. | 144/357 X |
| 4,207,472 | 6/1980 | Idelsohn et al. | 144/357 X |
| 4,316,491 | 2/1982 | Kearnes et al. | 144/357 |
| 4,468,993 | 9/1984 | McCown et al. | 83/112 |
| 4,640,160 | 2/1987 | Hards | 144/379 X |

Primary Examiner—Joseph Ruggiero
Attorney, Agent, or Firm—Robert L. Harrington

[57] ABSTRACT

A log stem scanning system for a bucking operation. The bucking operation includes a log deck with logs delivered laterally onto a log stem holder and from the holder onto the conveyor chain for conveying the log stems in sequence through the bucking saw. The log stem holder constitutes a component of a scanning station. An overhead support has a carriage that is guided along the holder. Scanners carried by the carriage obtain dimensional data of the vertical and lateral diameters of the log stems at selected cross sections and a laser beam transmitter on the carriage transmits the data to a stationary computer mounted at one or both ends of the scanning station.

9 Claims, 2 Drawing Sheets

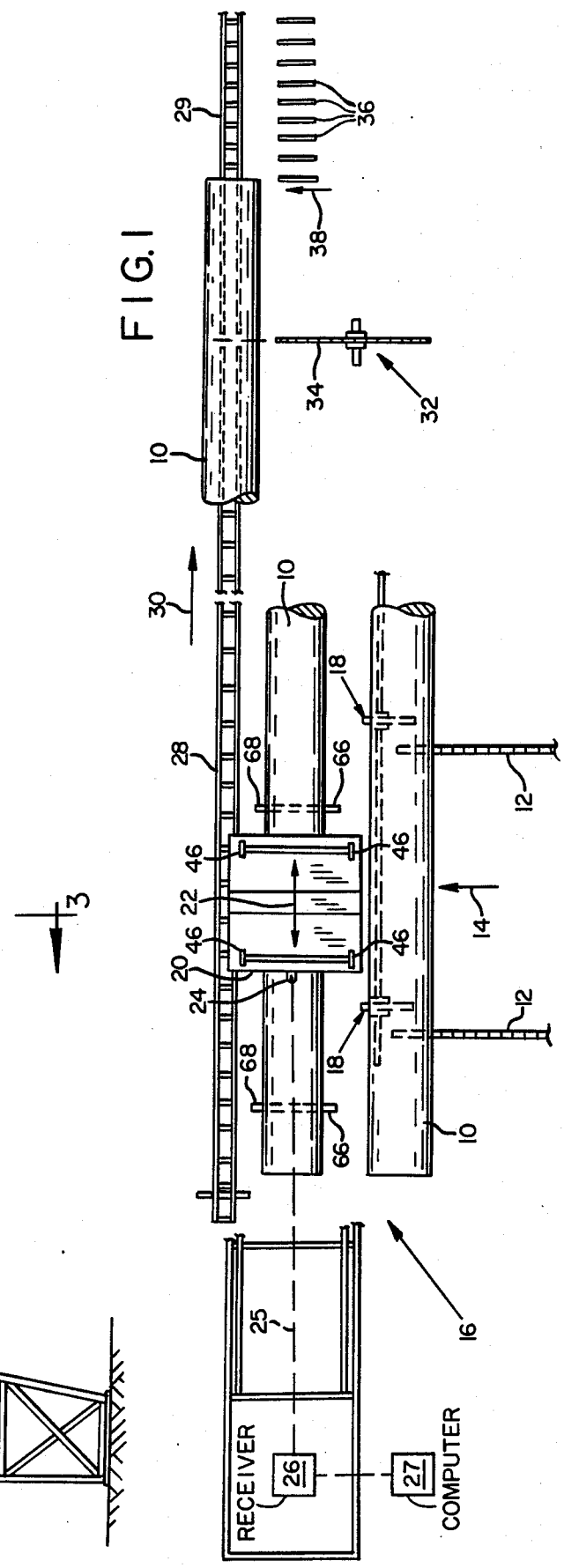
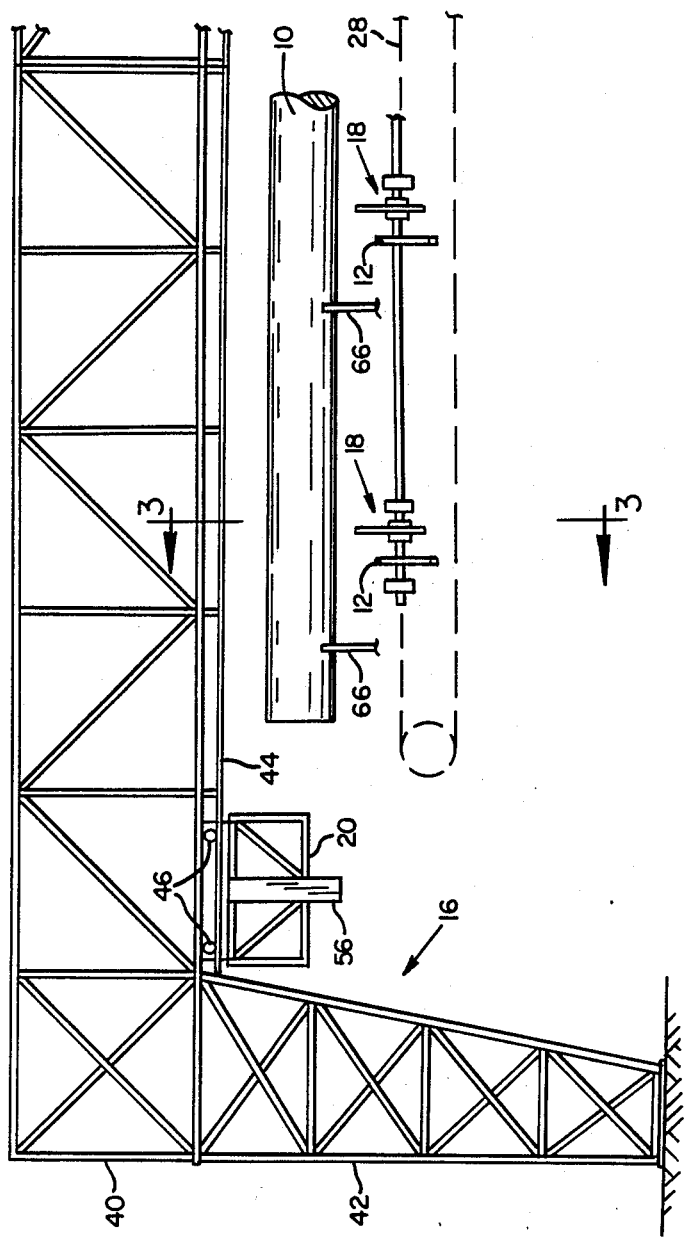

LOG SCANNING SYSTEM

FIELD OF INVENTION

This invention relates to a log scanning system particularly as applied to the operation of bucking, i.e. cutting of log stems into segments for downstream lumber processing.

BACKGROUND OF THE INVENTION

Log stems are typically about 60 feet in length. The 60-foot length is dictated by state road restrictions. That is, a log stem is the felled tree length that can be loaded onto trucks and hauled to a lumber mill. Most state requirements prohibit load lengths longer than 60 feet, and thus the stems are cut to that length and lumber mills are set up to handle logs 60 feet and shorter (the shorter stems, of course, resulting from trees that are shorter than 60 feet and also the balance of a much longer stem that has had 60 feet cut from it).

Over the years there has been an increasing awareness of the huge waste of wood from a tree. A tree that is standing has an enormous potential for usable lumber. However, every cut that is made reduces the options of the cutting pattern that can be fit to the log. Trees are first cut into stems, the stems into segments in a bucking operation at the sawmill site, the segments are cut into cants and the cants into specific lumber pieces, e.g. 1×4's, 2×4's, 2×6's, and so on, all having varying lengths of four feet, six feet, eight feet, etc. A tree that is standing will have a far greater potential than the lumber typically produced from that tree because of errors in making these cuts.

Improvements have been made in the analysis of the lumber potential for the segments. That analysis dictates the selection of the cutting pattern to thereby achieve substantially improved lumber production. One of the developments notable for accomplishing this improved analysis is REAL SHAPE TM. This is a scanning and computer analyzing process that extensively measures the log segment to enable a detailed model of the log to be created by the computer. The computer is programmed with the capability of fitting to that model the ideal cutting pattern for maximizing the value of the lumber produced. REAL SHAPE TM is made available by the Applied Theory division of U.S. Natural Resources, Inc., which division is located in Corvallis, Oreg.

The problem with the heretofore applied analysis of a log segment is that it is not made soon enough. A very substantial lumber potential for the log stem may already be lost when the stem is cut into segments.

Heretofore attempts have been made to analyze the log stem for determining the cutting of that stem into segments of optimal length. However, because of a number of inherent limitations, such analysis has been very crude and far short of the accuracy needed to consistently accomplish the desired potential.

The known prior analyzing systems all have had a common flaw. They attempt to scan or measure the log by moving the log stem through or past stationary scanners. Whereas log segments are successfully measured in that manner, log stems are a different matter. In a 60-foot length, the inconsistency of the log configuration along its length is particularly in evidence. For example, the log may taper from a large-end diameter of three feet and larger down to a small-end diameter of one foot and smaller. Along the length are twists and bends. Regardless of the conveying mechanism used for conveying the stem past the scanners, the log stem, which is very heavy and yet flexible, bends and twists as it is moved. The scanner depends on the log stem being fixed relative to the conveyor and thus scanning in this manner is not dependable and cannot be relied on to determine the optimum cutting pattern.

Futhermore, one might assume that only the log length needs to be known to determine the desired segment lengths. That is definitely not the case. For example, one portion of the log may be particularly suited for obtaining a precise number of 2×10's fourteen feet long, and 2×10's fourteen feet long may be at a premium price. Under the prior methods, that segment may be inadvertently cut into an eight-foot length or even split between two other segments, etc. This simple oversight is costly as once the segments are cut, the loss cannot be recovered.

Also to be considered is the practical constraint of applying a solution to existing lumber mills. Changing the in-feed of a log or otherwise creating a need for additional yard space can be costly or even prohibitive in applying a solution to existing lumber mills. Such changes are preferably to be avoided or minimized.

BRIEF DESCRIPTION OF THE INVENTION

The present invention solves the problem of log shifting, turning, etc., during scanning, by reversing the scanning process. That is, the log is laid at rest and a scanning apparatus is passed over the log segment. More particularly, in the preferred embodiment the log stem is rolled onto a scanning support and the support is elevated to expose the sides and bottom. A scanning unit, utilizing both reflective beam scanners and occlusion scanners, is set up to scan the circumference of the log at incremental cross section positions. The scanning unit is mounted on a sliding carriage that is moved rapidly down the log length. Cross sectional readings are taken by the scanning devices as desired, e.g. every two inches. The data thus collected is both exceptionally complete and highly accurate to enable the REAL SHAPE TM computer to correctly determine the optimum cutting pattern including the desired segmentation of the log. The log stem is then conveyed through the bucking saws and bucked into segments as directed by the computer.

Time is of the essence and this entire process cannot take a longer time than prior bucking systems. Prior bucking systems rolled logs onto a lengthwise driven conveyor chain in sequence, one after the other. A succeeding log was held in place ready to be rolled onto the conveyor only for the length of time that it took for the preceding log to be fed through the segmenting saws and out of the way.

The present scanning system is interjected between the holding station and the conveyor. Thus the logs are rolled onto the scanning support and scanned and computed while the prior log is being conveyed along the conveyor. The job of analyzing the log is completed and the log is ready to be transferred from the scanning support to the conveyor as soon as the prior log is passed through the bucking saws. The sequence of segmental cutting is continuous as before. Furthermore, very little extra yard space is required and the improved system can readily be incorporated into most existing yard spaces.

In order to accomplish the high speed scanning and computing, the stationary computer needs to be linked to the scanner for receiving and analyzing the data in an on-going manner. With the scanning unit carried by a high velocity sliding carriage, the manner of linking the computer and scanner is a major consideration. Cable connection is not considered feasible in view of the high speed movement of the scanner carriage relative to the stationary computer, and the substantial distance of relative movement, i.e. in the range of 60 to 100 feet. The preferred embodiment incorporates, as the linkage, a laser beam transmitter (on the carriage) and laser beam receiver (at the computer). The receiver is stationary at one end of the scanning support and the scanner moves up and down the logs (it moves one direction for one log and then the opposite direction for a subsequent log in obtaining the scan data). The information from the scanners is processed and conveyed to the laser transmitter which is mounted to the moving scanner unit on the carriage. The movement of the transmitter follows a straight line and the laser beam is simply directed along that straight line to the stationary receiver at one end (or if desireable, to receivers at both ends). The data is received and analyzed, and instructions are conveyed to the bucking saws by the time the log is positioned for its first bucking cut.

The invention will be more clearly understood by reference to the following detailed descriptions and drawings wherein:

FIG. 1 is a plan view of a log stem bucking operation incorporating the scanning system of the present invention;

FIG. 2 is an enlarged partial side view of the scanning station of FIG. 1;

Figure 3:
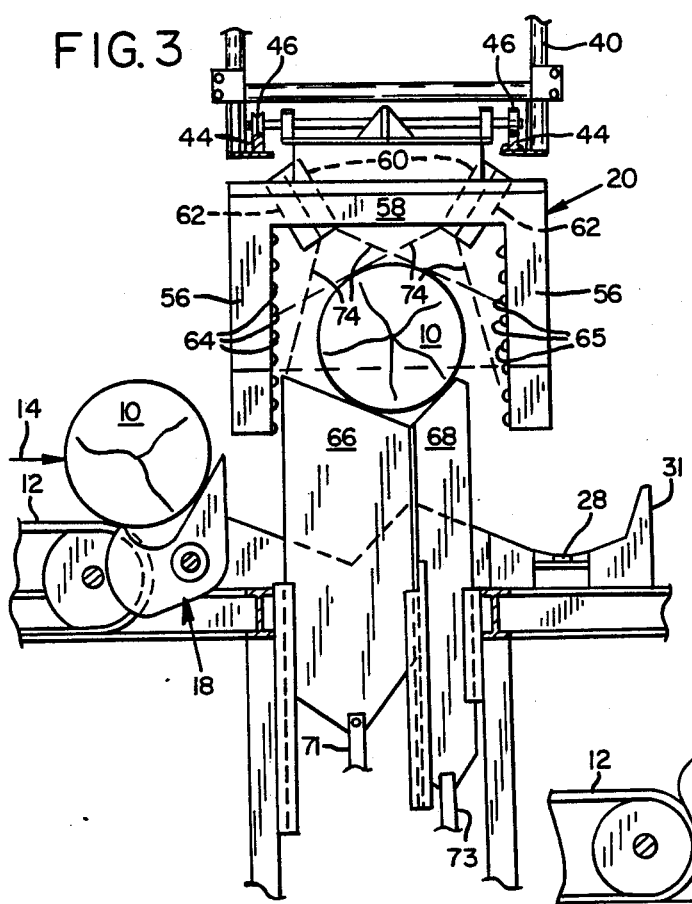
FIG. 3 is a section view as taken on view line 3—3 of FIG. 2.

Reference is made to FIG. 1 of the drawings which is a schematic illustration of a log bucking system incorporating the present invention. As illustrated, log stems 10 are conveyed laterally along a log deck by deck chains 12 to conventional stop-and-loaders 18 (the movement being indicated by arrows 14). The system herein described is, of course, exemplary and those skilled in the art will readily recognize that it is also common to feed logs end-wise to a position adjacent the stop-and-loader 18. From there the operation would be the same as will be apparent.

Positioned at the end of the log deck is a scanning station 16. Log stems 10, in sequence, are deposited into the scanning station from the log deck by the stop-and-loaders 18. A scanning carriage 20 measures the log stem circumference at spaced increments as the carriage is conveyed down the length of the log (arrows 22). The measurements are processed by an on-board processor (not shown) and transmitted by a laser beam transmitter 24 (also on board the carriage 20) to a stationary laser beam receiver 26 (as indicated by beam 25) connected to a computer 27. Only one receiver 26 is shown at one end of station 16 but of course a similar set up at the other end is available and in some cases may be desireable. The computer receives the screened or processed data and computes the optimum cutting pattern for the entire log stem, which in turn determines the desired log segments to be cut from the stem.

Upon completion of the scanning step, the log is transferred to the chain conveyor 28 for conveying the log lengthwise (indicated by arrows 30) toward a bucking station 32. The bucking station includes a bucking saw 34 and stops 36. The stops 36 are spaced at increments of two feet, four feet, six feet, eight feet, ten feet, etc., from the saw 34. Thus if the computer determines that a first segment of four feet is to be cut from the stem, then the appropriate stop 36, spaced four feet from the saw 34, is moved (arrow 38) into the path of the stem. Abutment of the log stem end with the stop 36 stops the conveyor 28. The saw 34 is activated (automatically or manually) for cutting the four-foot segment. The segment is then transferred by continuing chain conveyor 29 (moving at a higher speed than does chain 28) and the remainder of the log stem is continued on toward one of the stops, again selected by the computer.

The above process steps are not new except for the interjection of the scanning station between the log deck and the conveyor. Heretofore the log deck was continued right up to the conveyor 28 with a stop-and-loader (18) positioned adjacent the conveyor. The log stems 10 were loaded directly onto the conveyor 28, i.e. they were not pre-scanned. Stationary scanners along the conveyor 28 were used in an attempt to measure the log stem configuration as the log was conveyed toward the bucking station. However, as previously explained, such measurements were not accurate due to shifting and twisting of the log as it was conveyed on the conveyor and the measurements fell far short of determining the optimum segmentation of the stem.

Reference is now made to the scanning station 16 illustrated in the views of FIGS. 2 and 3. The scanning station includes an overhead truss 40 supported by two upstanding end truss columns 42. Guide rails 44 are suspended from the overhead truss 40 and span the distance between the truss columns 42. The scanning carriage 20 has wheels 46 that ride on the guide rail 44 permitting the carriage to be moved along the guide rails the entire distance between the end rails and thus along the entire length of a log positioned under the overhead truss 40.

Movement of the carriage 20 along the guide rails 44 is controlled by a cable extending around end pulleys mounted to the truss columns 42. One of the end pulleys is being driven by the shaft of a motor. This apparatus is common for controlling carriage movement and is deleted to avoid undue complexity in the drawings.

The components of the carriage 20 are more clearly illustrated in FIG. 3. As indicated, the carriage 20 includes guide wheels 46 that roll along the guide rails 44 and support the carriage suspended under the overhead truss 40. The carriage frame includes side standards 56 and a cross brace 58. The cross brace 58 carries two laser beam projectors 60 and two beam-detecting cameras 62. Provided at spaced increments down the side standards 56 are paired photodiodes 64 and photo-transistors 65. The laser beam projector 60, camera 62, photodiodes 64 and photo-transistors 65 are all used in the measuring process for measuring a log 10. This measuring process will be explained in a later section. The data that is obtained is collected by a processor (not shown) that screens the data (to avoid transmitting superfluous data) and the pertinent data is transmitted to the laser beam transmitter 24 which, as explained in connection with FIG. 1, transmits the scan data by laser beam 25 (FIG. 1) to the receiver 26 and onto the computer 27 for analysis.

Figure 4:
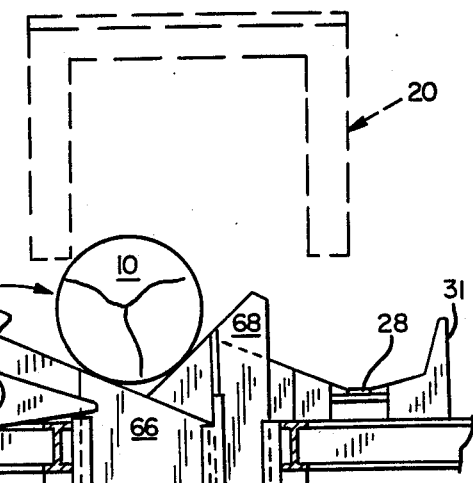
FIGS. 4 and 5 are views similar to FIG. 3, illustrating in particular the log support mechanism in its various positions.
Figure 5:
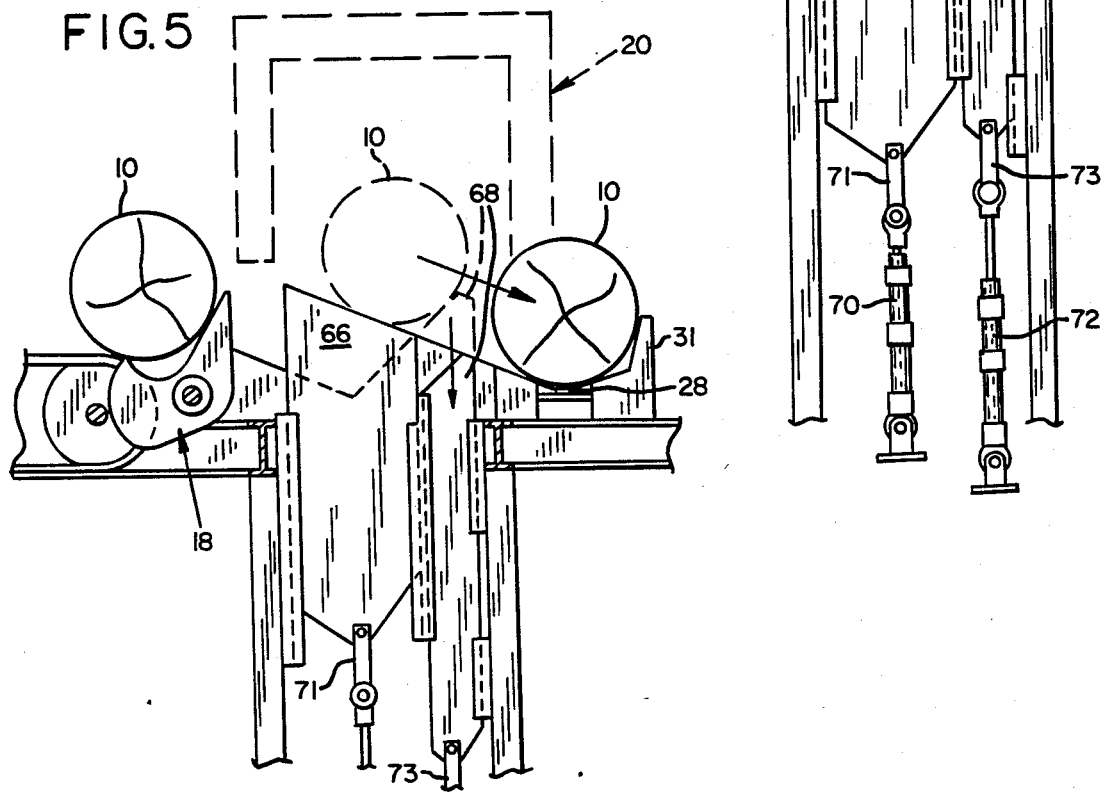

FIGS. 4 and 5 (in addition to FIG. 3) illustrate the log-lift mechanism used in the scanning station. Positioned adjacent to the stop-and-loader 18 is a V support provided by a pair of support ramps 66 and 68. The ramps are inclined in opposite directions as illustrated to cooperatively form a log-holding V. (The log receiving position being shown in FIG. 4.) Ramps 66 and 68 are independently raised and lowered by hydraulic cylinders 70 and 72 (through rods 71,73). The ramps 66,68 are cooperatively raised by cylinders 70,72 and rods 71,73 to lift the log into the scanning position as shown in FIG. 3. When the scanning operation is completed, the ramps are selectively lowered as illustrated in FIG. 5, first to the dash line position, and then to a position where the log is rolled off the ramps and onto the conveyor 28 as shown in solid lines. (Rail 31 prevents the log from rolling over the conveyor chain 28.) The ramps 66,68 are then again selectively lowered to the position for receiving the next log 10.

OPERATION

The operation of the scanning system will now be explained.

The scanning carriage 20 is always parked at one end or the other of the scanning station 16 which ends are in excess of 60 feet apart, e.g. approximately 90 feet apart and thus beyond the ends of the logs 10 on the log deck 12. A log is rolled from the stop-and-loader 18 onto the lifting V of ramps 66,68 (FIG. 4). The lifting V ramps 66,68 raise the log to a position within the frame of the carriage as indicated in FIG. 3.

The motor and cable controlling the carriage position are engaged to move the carrier down the length of overhead truss 40, i.e. from one end of the log to the opposite end of the log where it is parked until the next log is brought into position for scanning. As the carriage is swept over the log 10, the two scanning systems (60,62 and 64,65) generate scan data which (following the processing operation) are transmitted by the laser beam transmitter 24 to the receiver 26 and then the computer 27. The computer 27 analyzes the data taken from specific increments along the log length, e.g. every two inches of movement of the carriage.

The photodiodes, photo-transistors, (break beam or occlusion scanners) take readings at 0.1 inch increments in elevation and every two inches in length of travel. Thus the computer knows the beginning and end of the log (within plus or minus one inch). At two inch increments, it knows the vertical diameter dimension (within plus or minus 0.1 inch).

The lateral diameter reading is taken by the cameras 62 which read the position of multiple points of a laser beam line projected on the log. The line is projected in excess of halfway around the log (note the span of projector beams 74 from the combined projectors 60). Through the process of image reflection and triangular computation commonly employed in the lumber processing arts, the camera 62 obtains the data necessary for the computer to determine the lateral diameters, again at two-inch increments.

Because the data is being conveyed and computed continuously due to the laser beam transmission, within a short time of when the carriage is passed over the log stem the computer's computations are completed. During the completion of the computation, the ramps 66,68 are lowered, the ramp 68 being continued below ramp 66 shown in FIG. 5, so that the log is simply rolled off the ramps and onto the conveyor. The computer will have computed the optimum cutting pattern for the log stem and that computation will determine the optimum bucking cuts. The computer appropriately instructs the stops 36 of the bucking station 32. (Alternatively, the instructions may be conveyed to an operator at a console for manual activation of the bucking saw and/or stops.)

Once the log is rolled off of the ramp 68, ramp 68 is raised to again cooperatively form the V-lift with ramp 66 as shown in FIG. 4. The stop-and-loader 18 is then activated to transfer a subsequent log onto the V-lift, and the process is repeated.

Many of the components described above are known to the art and need not be specifically described. Log decks and stop-and-loaders are well known as are the log conveyors and computer-controlled bucking saws and stops. Cameras and laser beam projectors are in wide use for obtaining dimensions of a log's circumference and so are occlusion scanners for that same purpose.

The invention here described involves the provision of these components in a manner whereby the conventional system of bucking log stems is readily adaptable to a vastly superior method of scanning in accordance with the present invention. The log deck is simply spaced away from the conveyor and the scanning station of the invention is interjected between the log deck and conveyor.

Important to the invention is the concept of scanning the log with the log lying in repose but without interrupting the continuity of logs being fed to the bucking station. Carriages scanning is unique in and of itself in achieving this end. Whereas prior systems incorporated hundreds of scanning photodiodes and photo-transistors or dozens of laser projectors and cameras, the scanning carriage of this invention enables the same or increased output of data with but a single scanning setup.

The concept of transmitting the data "on the fly" from the scanning carriage is also believed novel, although laser beam transmitters as such, are not new, and the details thereof need not and are not provided.

Many variations and alternatives will become obvious to those skilled in the art without departing from the invention, the definition of which is contained in the claims appended hereto.

We claim:

1. A log stem scanning system comprising; an overhead carriage support including a carriage guide extended along the length of the overhead carriage support from end to end thereof, a scanning carriage mounted to and movable on the carriage guide along the length of the overhead carriage support, control means for controllably moving the carriage from end to end relative to the overhead carriage support, scanning means mounted to the carriage for on-the-fly scanning of selected cross sections at the top, bottom and sides of a log stem held in place under the overhead carriage support, log stem supporting means for supporting a log stem in place under the overhead carriage support and along the path of the scanning means carried by the carriage and while supporting the log exposing the top, bottom and sides of the log to the scanning means, a computer means for analyzing scan data developed by said scanning means, and transmission means for transmitting scan data from the scanning means, and said computer means for receiving the transmitted data and for computing therefrom the desired segments to be cut from the log stem.

2. A log stem scanning system as defined in claim 1 including lifting means for lifting the log stem supporting means and thereby moving the log supporting means between a first position for receiving a log and a second elevated position for log scanning.

3. A log stem scanning system as defined in claim 2 wherein said log lifting means has a third position for log ejection.

4. A log stem scanning system as defined in claim 1 wherein the transmission means is a laser beam transmitter mounted on the carriage for projecting a data-bearing laser beam along the path of the carriage, and a laser beam receiver in the path of the laser beam at least at one end of the carriage support, said receiver linked to said computer means and receiving the scan data from the laser beam for conveyance to the computer means.

5. A log stem scanning system as defined in claim 1 wherein the scanning means includes standards depending from the carriage along each side of a log stem in place on said log stem supporting means, an array of photodiodes on a standard on one side and an array of photo-transistors on a standard on the other side that function in concert to determine the vertical dimensions of the log at the selected cross sections, and said scanning means further including an image projector projecting a line image laterally across the log and an image detector receiving the reflected line image and determining thereby the lateral dimensions of the log at the selected cross sections.

6. A system for scanning log stems being conveyed from a log stem holding area to a bucking station comprising;
    stop-and-loaders for lateral transfer of a log from a log stem holding area,
    a log stem conveyor means for conveying log stems longitudinally through a log bucking station including a bucking saw and computer-controlled log stops that cooperatively stop the log stem at a desired position relative to the bucking saw for sequential segmenting of the log stem,
    said conveyor means selectively positioned relative to the stop-and-loader whereby the log stems are laterally conveyed from the log stem holding area toward said conveyor means for depositing of the log stems sequentially from the log stem holding area onto the conveyor means, and the improvement that comprises;
    a log stem scanning station interjected between the log deck and conveyor means, said scanning station including a log stem supporting means for receiving a log stem from said log deck, holding the log in place and transferring the log stem onto the conveyor means, control means for controlling the receiving, holding and transferring functions of said log stem supporting means,
    said scanning station further including an overhead carriage support extending along the length of the log stem supporting means and over a log stem supported thereon, a scanning carriage supported on said overhead carriage support for guided movement along the support and along a log stem supported on said log stem supporting means, and scanning means carried by said scanning carriage for determining dimensions of the log stem at selected cross sections, and
    said scanning station further including computer means and data transmitting means for receiving and transmitting data from said scanning means to said computer means, said computer means adapted to compute an optimum cutting pattern for the log stem and from the computation the desired segmentation thereof.

7. A system as defined in claim 6 wherein the log stem supporting means of the scanning station includes lifting means for lifting a log stem on said supporting means between a log receiving position and an elevated log scanning position, said log supporting means comprising independent ramp sections cooperatively forming a log holding V and said lifting means independently and cooperatively raising the ramp sections for lifting of a log supported thereon, and one of said ramp sections being movable independently of the other for lowering one of the arms of the holding V to induce rolling of a log stem thereon from the log stem supporting means onto the conveyor means.

8. A system as defined in claim 6 wherein the scanning carriage comprises depending standards along the sides of a log supported on said log stem supporting means, said standards having cooperative arrays of photodiodes and photo-transistors for obtaining vertical diameter dimensions of a log stem at selected cross sections, and camera scanning means carried by said scanning carriage positioned over the log stem for obtaining lateral diameter dimensions of the log stem at selected cross sections.

9. A system as defined in claim 8 wherein a laser beam receiver and a data computing means mounted at least at one end of the scanning station and a data transmitting laser is mounted to the carriage, said laser receiving the data of this scanning means and conveying said data by laser beam projection to the laser beam receiver for transmission to the data computing means.

* * * * *